US005660304A

United States Patent [19]

Halsey et al.

[11] Patent Number: 5,660,304

[45] Date of Patent: Aug. 26, 1997

[54] VENDING APPARATUS AND METHOD HAVING IMPROVED RELIABILITY

[75] Inventors: James H. Halsey, El Dorado, Ark.; Scott Juds, Everett, Wash.; James W. Erwin, El Dorado, Ark.

[73] Assignee: IDX, Inc., El Dorado, Ark.

[21] Appl. No.: 643,254

[22] Filed: May 2, 1996

Related U.S. Application Data

[62] Division of Ser. No. 235,893, May 2, 1994, Pat. No. 5,586, 684.

[51] Int. Cl.[6] .......... B65G 59/00

[52] U.S. Cl. .......... 221/1; 221/90

[58] Field of Search .......... 221/1, 21, 2, 6, 221/7, 9, 13, 15, 82, 85, 76, 86, 90; 364/479

[56] References Cited

U.S. PATENT DOCUMENTS

| | | | |
|---|---|---|---|
| 3,087,649 | 4/1963 | Leonard et al. | 221/90 |
| 3,163,326 | 12/1964 | Sabin et al. | 221/90 |
| 3,752,358 | 8/1973 | Ohno | 221/90 |
| 3,802,601 | 4/1974 | Ohno | 221/90 |
| 4,278,182 | 7/1981 | Ahlstrom | 221/5 |
| 4,359,147 | 11/1982 | Levasseur | 194/200 |
| 5,111,962 | 5/1992 | Oden | 221/1 |
| 5,205,436 | 4/1993 | Savage | 221/1 |
| 5,273,183 | 12/1993 | Tuttobene | 221/7 |

*Primary Examiner*—Kenneth Noland
*Attorney, Agent, or Firm*—Diller, Ramik & Wight, PC

[57] ABSTRACT

A vending apparatus of the type having drop shelves, wherein the shelves are retained in an upright position by a solenoid, and wherein, when so positioned, the solenoid forms a series electrical circuit with the shelf, such that the position of the shelf can be tested by testing the integrity of this series electrical circuit. The vending apparatus can be equipped with an acoustic input, such that upon receiving a particular acoustic input signal, the machine will automatically test the position of the shelves by testing the shelf/solenoid circuit, and in this way, an inventory of the contents of the vending machine can be performed.

6 Claims, 8 Drawing Sheets

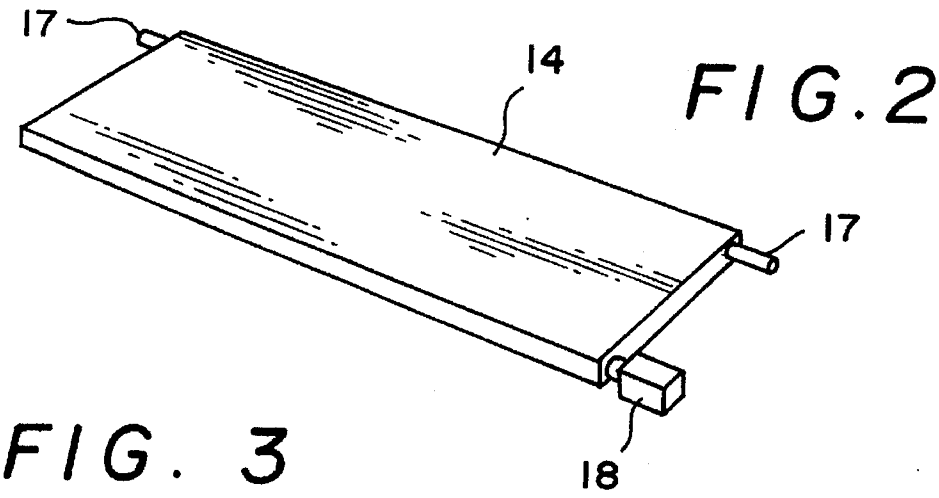
FIG. 2
FIG. 3
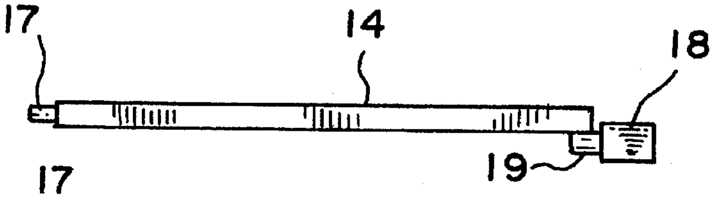
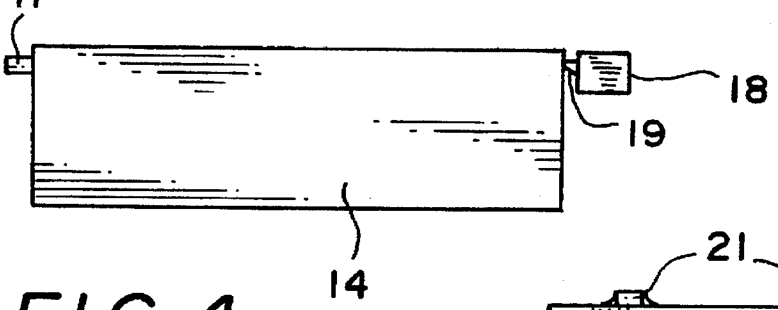
FIG. 4
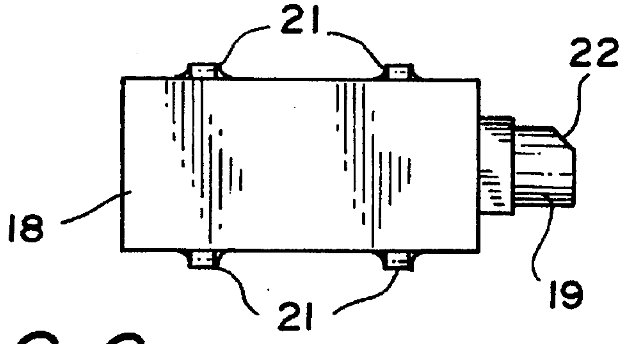
FIG. 6
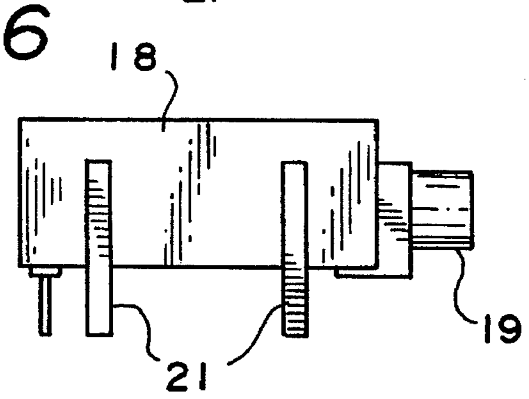
FIG. 5

VENDING APPARATUS AND METHOD HAVING IMPROVED RELIABILITY

This application is a division of application Ser. No. 08/235,893, filed May. 2, 1994, now U.S. Pat. No. 5,586, 684.

BACKGROUND OF THE INVENTION

This invention relates generally to vending machines, and more particularly to vending machines of the type that have horizontally disposed shelves that, when selected, pivot forward to allow products disposed on such shelves to drop and thereby be made available to a vending customer.

Vending machines are well known in the art. Such machines typically operate without close supervision, and allow a customer to select from one or more products that are contained within the machine. One type of prior art vending machine is known as a drop shelf vending machine. In a drop shelf vending machine, a plurality of shelves are horizontally disposed, such that products can be placed upon such shelves. The shelves are pivotally connected to a frame, such that when a particular shelf is selected, that shelf can pivot forward, thereby assuming a more vertical orientation and allowing a product that was disposed thereon to drop into an area of the machine that is accessible to the vending customer.

Prior art drop shelf vending machines are problematic in use. The shelf selection and drop mechanism is largely mechanical in nature, and frequently malfunctions. As a result, customers cannot obtain the products they select with assurance, even after depositing appropriate coinage into the machine. When this occurs, many such customers act out their disgruntlement on the machine itself, by striking the machine or worse. Sometimes this action is intended to unjam the machine and cause it to vend that which the customer has already paid for. Other times, the action is intended as a simple act of revenge, with damage to the machine being the primary intended result.

Other problems exist with prior art drop shelf vending machines. A proprietor can only determine whether such a machine requires restocking by physically visiting the machine, and opening the machine to allow a visual inspection. Physically visiting such a machine may not be convenient in all instances. Further, many such machines are located in unattended areas, and are therefore frequently burdened with a variety of security measures (including additional enclosure mechanisms and multiple locks). As a result, a considerable amount of time is required to open the machine, which time is wasted if the machine does not require restocking. Also, opening the machine when restocking is not really necessary is also potentially risky, since opening the machine also renders the coin collection box in the machine more readily available. Therefore, opening the machine when not really necessary also unnecessarily increases the risk of a concurrent act of robbery.

A need therefore exists for a drop shelf vending machine that operates more reliably than prior art devices. A need also exists for a drop shelf vending machine that need not be opened except when truly necessary for restocking purposes, or other required maintenance.

BRIEF DESCRIPTION OF THE DRAWINGS

These needs and others are substantially met through provision of the drop shelf vending machine disclosed herein, wherein:

FIG. 2 comprises a perspective view of a shelf and solenoid as configured in accordance with the invention;

FIG. 3 comprises a simplified front elevational view of the shelf and solenoid in a horizontal position as configured in accordance with the invention;

FIG. 4 comprises a simplified front elevational view of the shelf and solenoid in a dropped position as configured in accordance with the invention;

FIG. 5 comprises a side elevational view of a solenoid as configured in accordance with the invention;

FIG. 6 comprises a top plan view of a solenoid as configured in accordance with the invention;

DESCRIPTION OF THE PREFERRED EMBODIMENT

Figure 1:
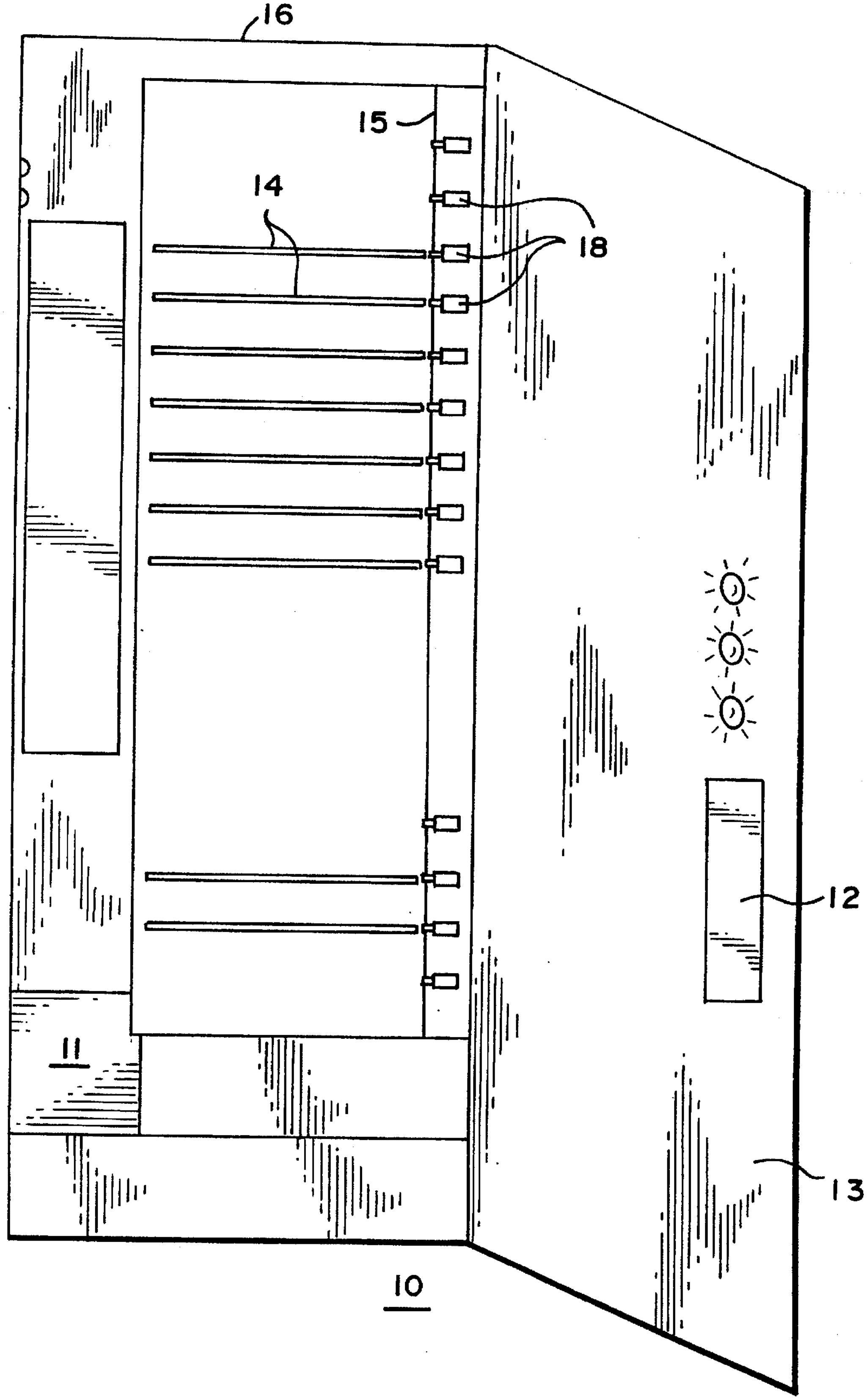
FIG. 1 comprises a simplified front elevational view of a drop shelf vending machine as configured in accordance with the invention.

Referring now to the drawings, and in particular to FIG. 1, a drop shelf vending machine can be seen as generally depicted by reference numeral 10. In many respects, the drop shelf vending machine 10 conforms to the known prior art, and hence, only a simplified diagram has been provided here for the sake of simplicity and brevity. Generally speaking, the drop shelf vending machine 10 includes a money box 11 where deposited coins or tokens are collected, a coin accepting unit 12 that determines when the customer has deposited sufficient coins (or tokens) to enable a vending transaction, a door 13 that can lock in a closed position to deny access to the interior of the vending machine to unauthorized persons, a plurality of shelves 14 that are disposed within a holding frame 15, and, of course, a housing 16.

With reference to FIG. 2, each shelf 14 comprises a rectangular flat plate (although in an appropriate embodiment, non-planar features, such as a lip on the forward edge, may be included) that is made of conductive material (at a minimum, the outer surface of the shelves 14 must be electrically conductive such that the shelf is electrically coupled to circuit ground, for purposes that will be made clear below). Pivot pins 17 are provided on the rearward sides of the shelf 14. These pivot pins 17 are inserted into holes in the holding frame 15, such that the shelves 14 can each pivot from a horizontal position (as depicted in FIG. 3) to a dropped position (as depicted in FIG. 4).

In this embodiment., each shelf 14 has associated therewith a solenoid 18. These solenoids 18 are mounted in proximity to the shelves 14, such that the plunger 19 of the solenoid will hold a corresponding shelf 14 in the substantially horizontal position (FIG. 3). When the solenoid 18 is energized, however, the plunger 19 withdraws to the interior of the solenoid 18, thereby allowing the shelf 14 to drop. Referring momentarily to FIGS. 5 and 6, each solenoid has four frame pins 21 to enable firm placement of each solenoid 18 on a circuit board, as described below in more detail. The plunger 19 can also be provided with a beveled surface 22, such that when a dropped shelf 14 is physically raised to the horizontal position, the plunger 19 will be urged inward of the solenoid 18 until the shelf 14 assumes the horizontal position, at which point, the plunger 19 will again assume its normal extended position has will be made more clear below, the solenoids 18 form a part of a shelf position detection circuit. Because of this, the plunger 19, internal spring (not shown), and spring stops (not shown) of the solenoids 18 are plated with non-corrosive conductive material to ensure good electrical contact in a variety of operating environments. (The spring and spring stops are otherwise well understood elements in the art, and hence are not described here in further detail.)

Figure 7:
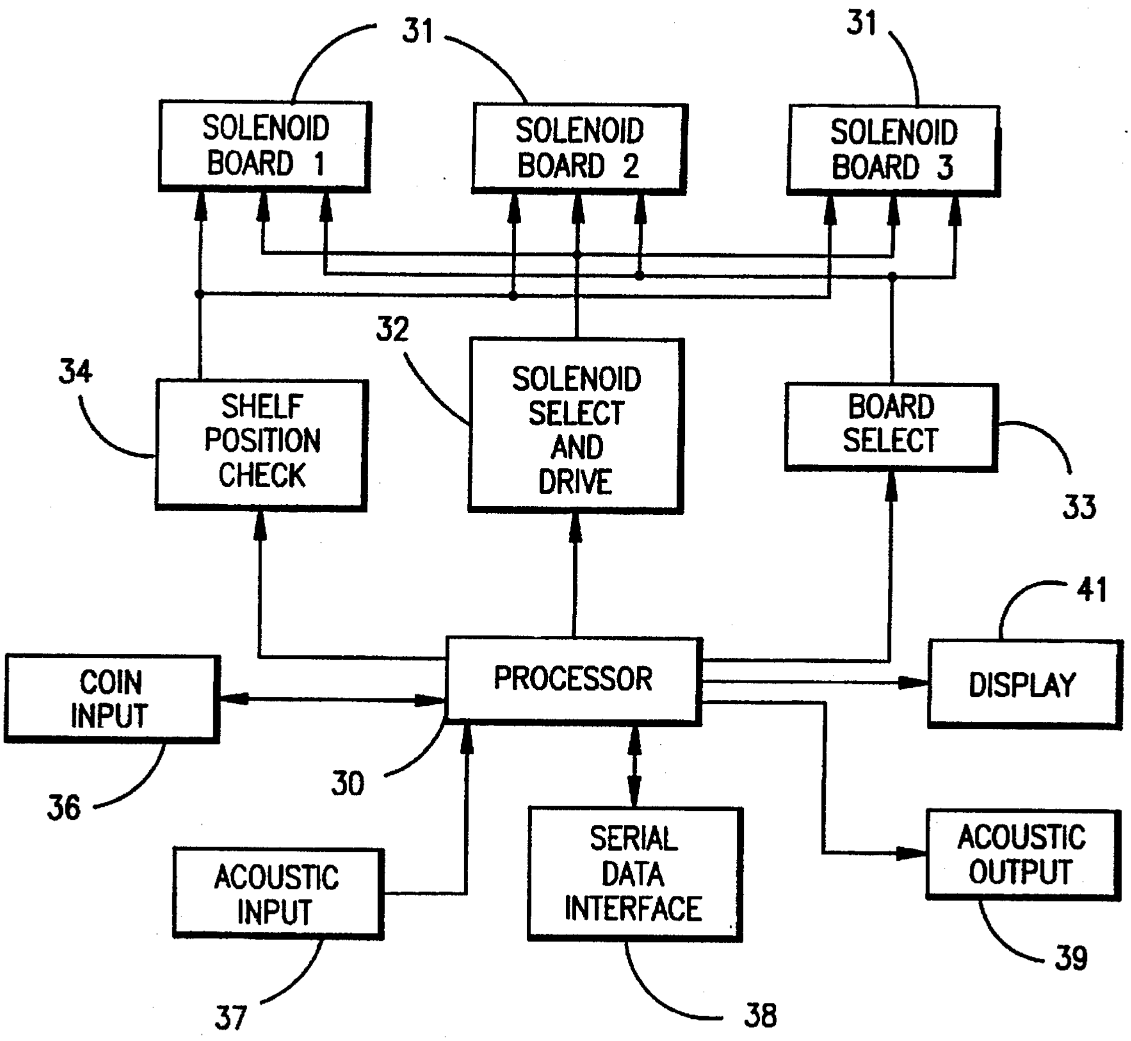
FIG. 7 comprises a block diagram view of the electronics for a drop shelf vending machine as configured in accordance with the invention.

Operation of the solenoids 18, and, hence, the shelves 14, is controlled electronically. Referring now to FIG. 7, a block diagram of the controlling circuitry will be provided.

The solenoids 18 are mounted on solenoid boards 31 (in this embodiment, there are three such boards 31, with each such board being able to accommodate seven solenoids 18, for a total of twenty-one solenoids 18), which solenoid boards 31 are described in more detail below. A processor 30 addresses and controls the solenoids 18 through solenoid select and drive circuitry 32 and a board select circuit 33. So configured, and as described below in more detail, the processor 30 can select a particular solenoid 18 on a particular solenoid board 31 by sending appropriate signals to the solenoid select and drive circuitry 32 and the board select circuit 33. In this embodiment, the processor 30 also couples to a shelf position check circuit 34 that in turn couples to the solenoid boards 31. Through this interface, and as explained below in more detail, the processor 30 can interrogate the solenoid boards 31 to determine which shelves 14 are still retained in a horizontal position and which have dropped.

The processor 30 also couples to a coin input device 36, an acoustic input 37, a serial data interface 38, an acoustic output 39, and a display 41. The acoustic input 37 provides information to the processor 30 regarding acoustic events, including forcible impacts on the housing of the vending machine itself. As described below in more detail, such impacts can be interpreted in various ways, and the processor can respond in different ways accordingly. The acoustic output 39 and the display 41 allow the processor 30 to communicate information to a customer or service personnel in audible or visual form. The serial data interface 38 allows service personnel to directly communicate with the processor 30 in order to obtain, for example, current inventory information and the like. Communications on such a serial data link can be initiated either by the processor 30 or by the service person, as may be appropriate to a particular circumstance; All of the above elements will now be described in more detail.

Figure 8:
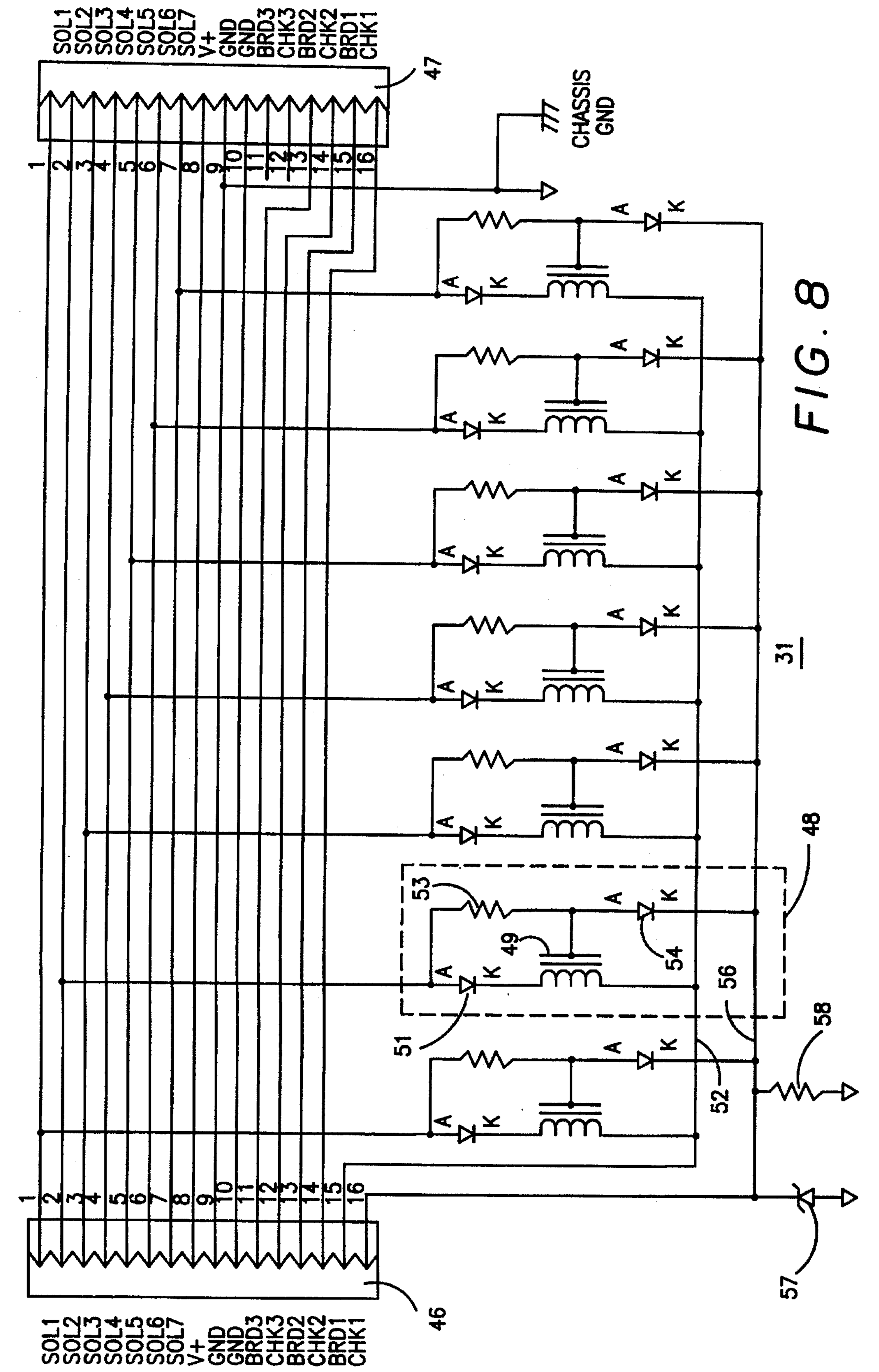
FIG. 8 comprises a schematic diagram of one solenoid board as configured in accordance with the invention.

Referring now to FIG. 8, a solenoid board 31 will be described in more detail. Each board 31 includes two connectors 46 and 47 (in this embodiment, provided by a Molex connector such as Molex Part No. 70246-1601) that each provide 16 connection pins. Presuming, for this example, that the board 31 depicted in FIG. 8 comprises solenoid board 1 in a particular installation, the leftmost connector 46 would allow the board 31 to be coupled to a main circuit board (described below) that includes the processor 30, and the rightmost connector 47 would allow the board 31 to be coupled to the next solenoid board. If the board 31 depicted were instead solenoid board 2, then, of course, the leftmost connector 46 would couple the board 31 to the first solenoid board, and so forth.

Each solenoid board 31 includes seven solenoid circuits 48; since each solenoid circuit 48 is identical to the other, only one need be described in detail. Each solenoid circuit 48 includes a solenoid 49 that couples in series with a 1N4004 diode 51 between a connector line for that particular solenoid circuit and an enable line 52 for that particular solenoid board 31. A 2.2K Ohm resistor 53 then connects between the anode of the diode 51 and an electrical connection to the plunger of the solenoid 49, and a second 1N4004 diode 54 couples between the solenoid tap and a shelf position check line 56. Lastly, the shelf position check line 56 also connects to a grounded 1N4732 4.7 volt Zener diode 57 and a grounded 2.2K Ohm self position sense resistor 58.

So configured, a particular solenoid 49 can be energized by pulling high the solenoid line for that solenoid and by drawing low the enable line 52 for the solenoid board that includes the particular solenoid. The series coupled diode 51 then prevents reverse flow current from flowing through the other solenoids. To determine whether a particular shelf is in a horizontal or dropped position, the solenoid line for the corresponding solenoid 49 is raised high, and the shelf position check line 56 is tested. If the shelf remains in a horizontal position, a circuit will be completed that includes the shelf, the solenoid plunger, the solenoid spring, the solenoid housing, and the other circuit elements noted above, thereby coupling the connection between resistor 53 and the second diode 54 to ground via the shelf. This circuit holds the voltage across the shelf position sense resistor 58 to 0 volts. If, however, the shelf has dropped, current through the second resistor 53 will flow through the second diode 54 to the shelf position sense resistor 58, thereby raising the voltage across the latter resistor 58 until it equals the Zener voltage of 4.7 volts. Thus, each shelf can be easily tested by the processor 30. Various ways of using this capability are set forth below.

Figure 9:
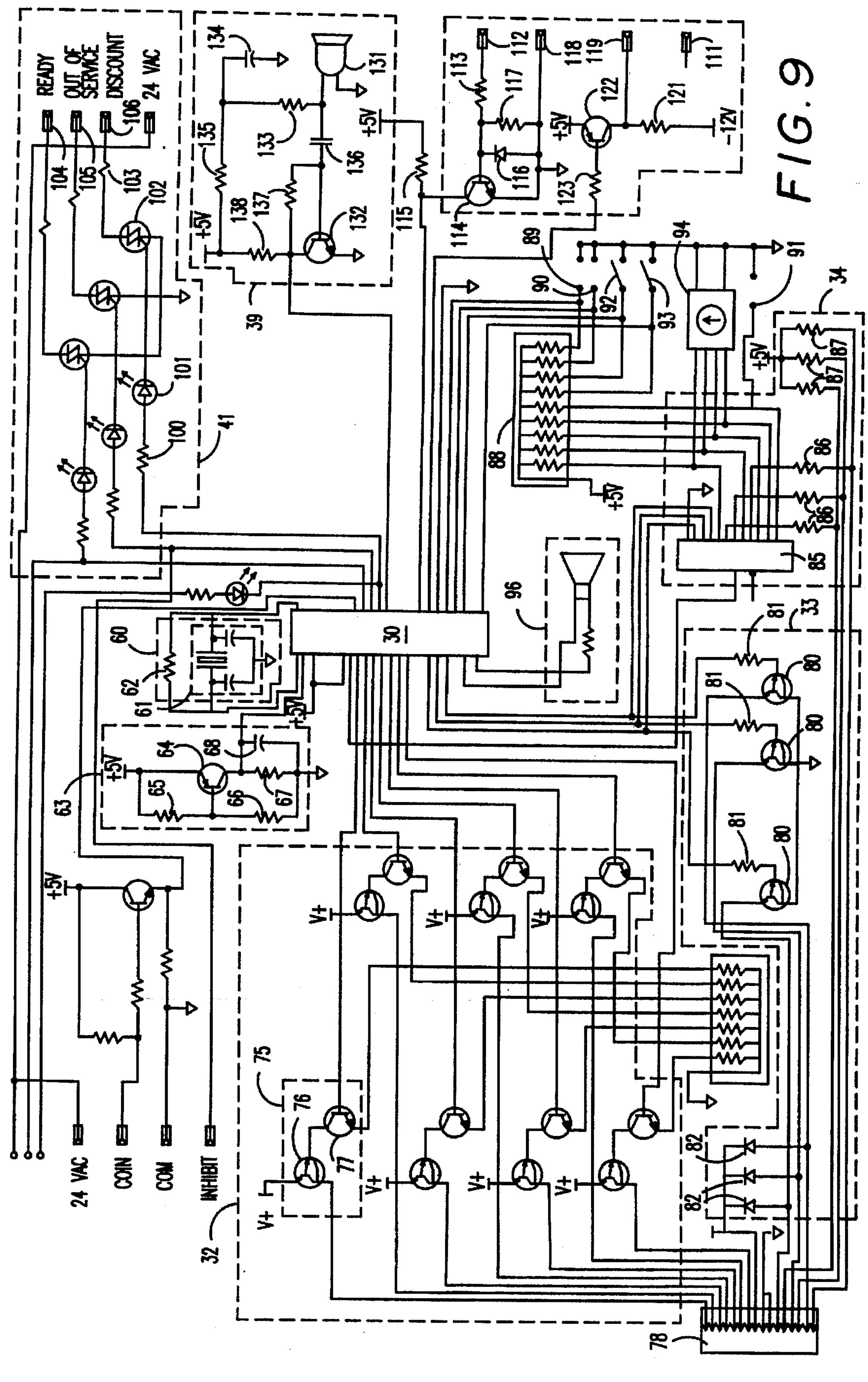
FIG. 9 comprises a schematic diagram of a main circuit board as configured in accordance with the invention.

Referring now to FIG. 9, a main circuit board will be described, which circuit board includes the processor 30. In this embodiment, the processor 30 comprises a 68HC805C4 as manufactured and sold by Motorola, Inc. The OSC1 and OSC2 clock pins of the processor 30 connect to a clock circuit 60 that includes a 4 MHz resonator circuit 61 and a parallel coupled 4.7M Ohm resistor 62. This clock circuit 60 provides a 4 MHz clock signal to the processor 30 in accordance with well understood prior art technique.

In this embodiment, the reset pin of the processor 30 connects to a reset circuit 63. This reset circuit 63 includes a PN2907A transistor 64 having an emitter that couples to a positive 5 volt supply and a collector that couples to the reset port. A 47K Ohm resistor 65 connects between the emitter and the base, and a 240K Ohm resistor 66 connects the base to ground. Lastly, a parallel coupled 240K Ohm resistor 67 and an 0.1 micro Farad capacitor 68 are connected between the emitter and ground. So configured, at power up, the reset circuit 63 will provide a reset signal to the processor 30 in accordance with well understood prior art technique.

The IRQ and TCAP ports of the processor 30 are inactive and connect to a positive 5 volt supply.

The solenoid select and drive circuitry 32 will now be described. This circuit 32 includes seven transistor pairs 75 (since each pair is identical to the other pairs, only one pair will be described in detail). Each pair 75 includes a TIP125 power transistor 76 and a PN2222A transistor 77 configured together as shown. The PA1 through PA7 ports of the processor 30 comprise the select ports, and each connects to one of the transistor pairs 75. Each transistor pair 75 then couples to a connector 78, which connector 78 is configured to electrically and physically couple with the corresponding connector 46 as provided on the solenoid board 31 described above.

So configured, each processor select port (PA1–PA7) can drive a corresponding transistor 77, which in turn will drive a power transistor 76 to cause the corresponding output to the solenoid board to be pulled up to a supply level (in this embodiment, +38VDC, the latter being sufficient to drive the above described solenoids 49).

The board select circuitry 33 will now be described. The board select circuitry 33 includes three TIP120 power transistors 80, each coupling through a 2.2K Ohm resistor 81 to an output port (PB0–PB2) of the processor 30 as depicted. The output of each power transistor 80 couples to the appropriate board select pins of the solenoid board interface connector 78, and also to a 1N4004 diode 82. So configured, the output ports of the processor 30 can be used to pull down the board select lines as appropriate to cause selection of the appropriate solenoid board. The diodes 82 serve to clamp inductive flyback voltage when the power transistors 80 of the board select circuit 33 switch off the corresponding solenoid 49 on the solenoid board 31.

The shelf position check circuit 34 includes a 74HC151 1-of-8 data selector 85. Such a data selector 85 allows one data port (D0–D7) at a time to be selected via the address ports (A–C), and the condition of that selected data port is applied to the output (pin 5). The A, B, and C address pins of the data selector 85 are coupled as shown to the PB0–PB2 pins of the processor 30. The D1, D2, and D4 data ports are used in this embodiment to support the shelf position check function, and each of these data ports couples through a 100K Ohm resistor 86 to a 100K Ohm pull-up resistor 87 and to the corresponding shelf check pins of the solenoid board interface connector 78. The shelf check circuitry on the solenoid boards 31 functions as described earlier, and will provide a high signal to this interface connector 78 when the shelf has dropped. This high condition will in turn be presented at the output (pin 5) of the data selector 85 when the corresponding data input has been selected, and the processor 30 will receive this information at its PA0 port, thereby allowing the processor 30 to identify which shelves have been dropped.

In this embodiment, other information can also be provided to the processor 30 through the data selector 85. Through use of a 47K Ohm pull-up resistor network 88 and the various jumpers 89–91 and switches 92–94 depicted, various operating functions can be set, altered, and configured. For example, the first jumper 89 can be used to set an alternative shelf configuration (for example, to accommodate larger sized product items, alternate shelves might be retained in a dropped position upon initial stocking of the vending machine). The second jumper 90 can be coupled to a door position sensor, to allow the processor 30 to detect when an access door to the vending machine has been opened. As a possible response, a beeper circuit 96 can be provided, such that an audible alert can be provided. The third jumper 91 can be utilized to apply a preset scaling factor to pricing for items to be vended. The first two switches 92 and 93 can be used to provide discount information to the processor 30, and the last switch 94 can be used, for example, to set vending prices in general.

As noted above, the processor 30 couples to a coin input apparatus 36 (FIG. 7). (Such coin input apparatus are known in the art, and therefore will not be described in more detail here.)In this embodiment, the coin input 36 apparatus of choice couples to the processor 30 through the processor's PC0 port. So coupled, the coin input apparatus will provide an appropriate signal to the microprocessor 30 when appropriate coinage has been deposited, or, depending upon the particular apparatus used, may simply provide a signal to the processor 30 with the deposit of each coin or token.

This embodiment includes a visual display 41 that includes 3 lamps (not shown in FIG. 9). A lamp driver circuit is provided for each lamp, with each circuit including a 470 Ohm resistor 100, an LED 101, and a silicon controlled rectifier (SCR) 102. The trigger gate of the SCR 102 couples through the series connected LED 101 and resistor 100 to an output pin of the processor 30 (in this embodiment, pins PC1, PC2, and PC3). The switch ports of the SCR 102 are coupled in series with a fuse 103 and a jack that allows the lamp driver circuit to be coupled to a display lamp of choice. In this embodiment, one lamp driver circuit provides a "ready" signal 104, one provides an "out of service" signal 105, and one provides a "discount" signal 106. Other display mechanisms could of course be utilized as will be well appreciated by those skilled in the art.

The serial data interface 38 in this embodiment comprises an RS-232 computer link, with one pin 111 being left unconnected. A receive pin 112 connects through a 10K Ohm resistor 113 to the base of a PN2222A transistor 114, the collector of which connects to a 47K Ohm pull-up resistor 115 and to pin PD0/RD1 of the processor 30. The emitter of this transistor 114 couples to ground. The base also connects to ground through a parallel coupled 1N4148 diode 116 and a 10K Ohm resistor 117. A ground pin 118 for the link couples to ground. The transmit pin 119 of the link 38 couples between a pull down 10K Ohm resistor 121 and the collector of a PN2907A transistor 122. The emitter of this transistor 122 connects to a positive supply, and the base couples through a 10K Ohm resistor 123 to pin PD1/TD0 of the processor 30. So configured, instructions and data can be exchanged with the processor 30 via this link 38.

Lastly, FIG. 9 provides additional detail regarding the acoustic input 39 circuitry. This circuit comprises a noise detector circuit, and includes a microphone 131 (such as a Panasonic WM-54BT) and a PN2222A transistor 132. One microphone port couples via a 2.2K Ohm resistor 133 to a grounded 2.2 micro Farad capacitor 134 and through a 2.2K Ohm resistor 135 to a positive 5 volt source. This same microphone port also couples through a 0.1 micro Farad capacitor 136 to the base of the transistor 132. The emitter of this transistor 132 connects to ground, and the collector couples: (1) through a 1M Ohm resistor 137 to the base thereof; (2) through a 240K Ohm resistor 138 to the 5 volt source; and (3) to pin PC4 of the processor 30. So configured, acoustic inputs greater than a predetermined threshold will be converted into a "noise detected" signal that is provided to the processor 30. The purpose of this will be made more clear below.

Figure 10:
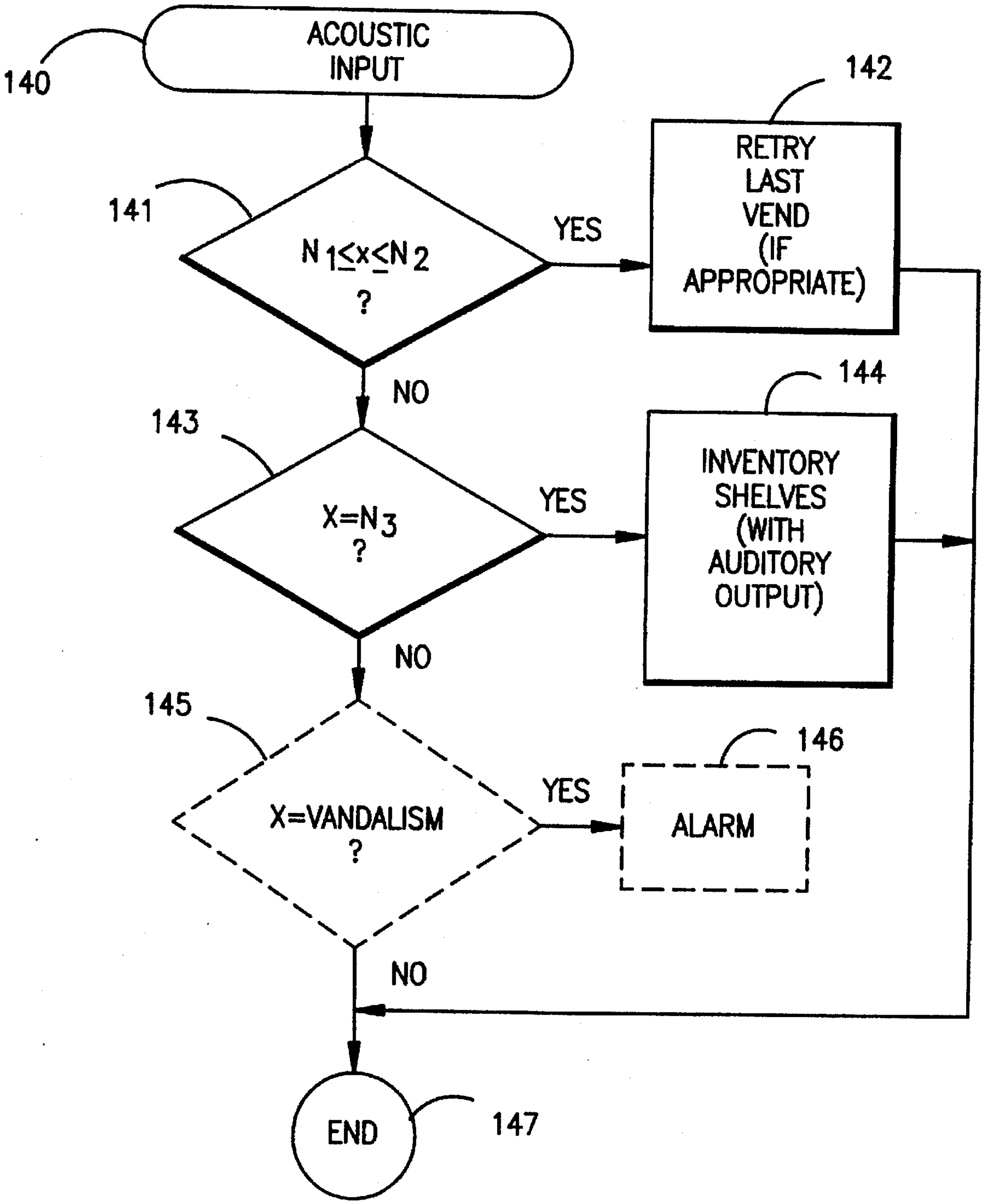
FIG. 10 comprises a flow diagram depicting operation of a drop shelf vending machine as configured in accordance with the invention.

Referring now to FIG. 10, certain operating modes of this embodiment will be described. An acoustic input received through the acoustic input circuit 37 can be indicative of a number of possible conditions, including: (1) vandalism; (2) an upset customer; or (3) an authorized person seeking to interrogate the processor 30 for certain information.

With this in mind, in FIG. 10, when an acoustic input(s) is(are) being received, a determination is made as to whether such input(s) is indicative of an upset customer who has deposited his money, but who has not received the selected product due to a stuck shelf. In this embodiment, if the number of discrete acoustic inputs that are received over some predetermined period of time (such as 1 second) are less than a predetermined number, than that condition is interpreted as an unhappy customer situation. More particularly, if the number of acoustic inputs X is greater than N1 (such as 0) but less than or equal to N2 (such as 4) 141, then the processor 30 identifies the situation as involving an upset customer, and the processor 30 then retries the last vending action 142. In a preferred embodiment, this retry action is only invoked if the processor 30 has already determined that the prior shelf was not sucessfully dropped.

If the acoustic inputs do not satisfy the above condition 141, the processor next determines whether the acoustic inputs equals a predetermined number N3 (such as five) 143. If true (as occurs when the operator raps 5 times within one second on the side of the vending machine), the processor will initiate a shelf inventory function (with auditory output) 144 as described below with respect to FIG. 11.

If the acoustic inputs do not match either of the above conditions, then, optionally, the processor can identify the precipitating conditions as representing vandalism, and an alarm alarm can be activated. This alarm can be, for example, an audible alarm at the site of the vending machine, and/or a remote alarm at the site of an appointed caretaker or guard.

The process then concludes 147.

Figure 11:
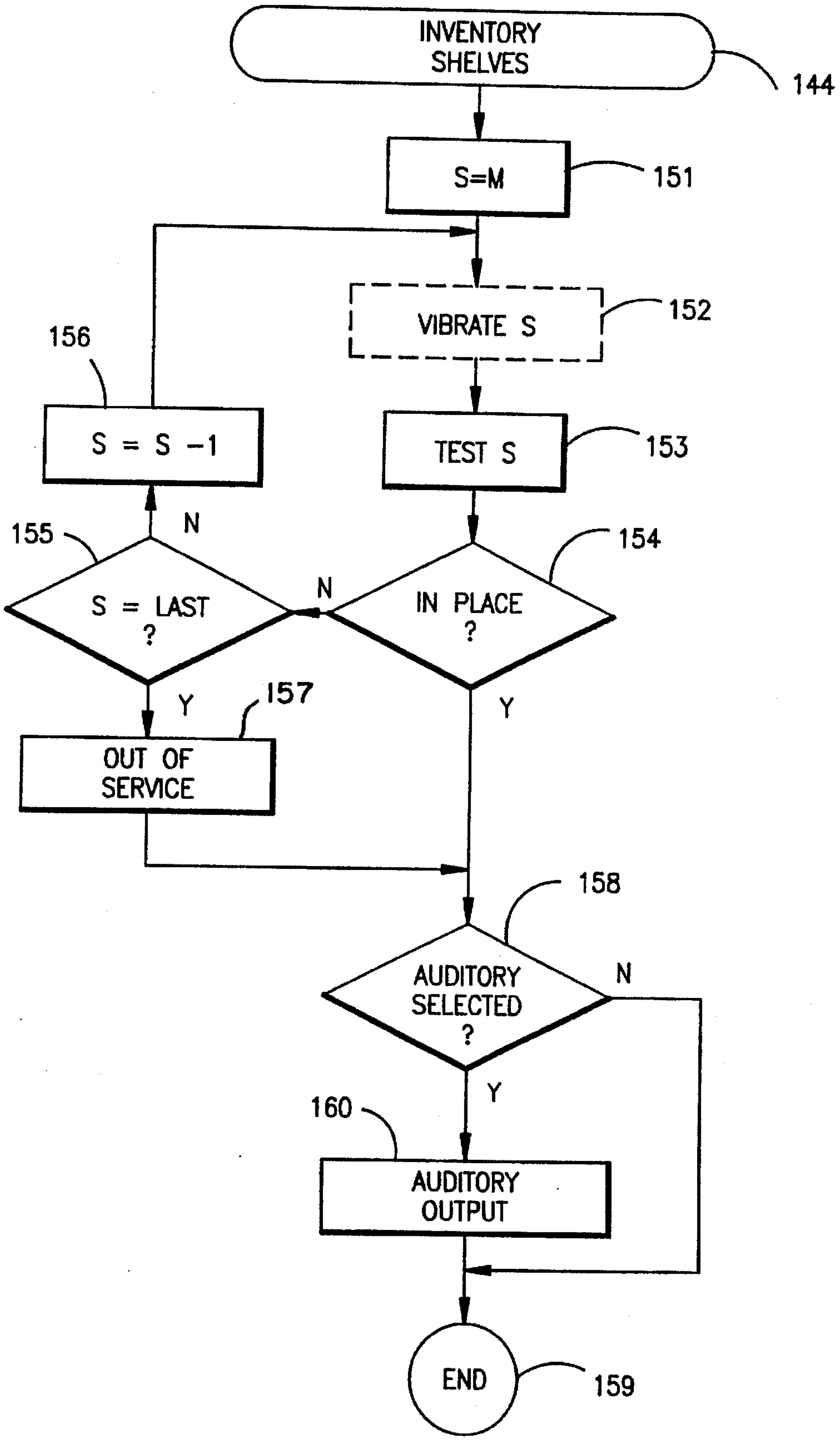
FIG. 11 comprises a flow diagram depicting operation of a drop shelf vending machine as configured in accordance with the invention.

Referring now to FIG. 11, the shelf inventory process 144 as mentioned above will now be described in more detail. To begin, a variable S is set to equal the total number of shelves M in the machine 151. In this embodiment, the number of shelves equals 21. Then, optionally, the first shelf to be tested can be vibrated by applying power in a rapidly cyclical manner to the associated solenoid for that shelf. This optional step 152, when done, will tend to ensure a better electrical contact between the shelf and the solenoid itself. The position of the shelf can then be tested, as described above, by testing for the circuit connection between the solenoid and the shelf 153 (in this embodiment, the shelves are tested by beginning with the lowest shelf, and moving upwards towards the highest shelf). If the shelf being tested is not in place 154, thereby indicating that the tested shelf has been dropped, the process determines 155 if the shelf just tested comprises the last shelf to be tested.. If not, variable S is decremented by one 156 and the process repeats for the next highest shelf. If the shelf just tested is the last shelf, then all of the shelves have been dropped, the machine has run out of inventory, and the process invokes and "out of service" mode 157.

Upon invoking the "out of service" mode 157, or if a shelf test determines that a shelf is still in place 154, the process then determines whether an auditory mode has been selected 158 by the operator. If not, the process concludes 159. If true, then an auditory output is provided 160. For example, in this embodiment, a short chirp is provided for each shelf that remains in position (the number of shelf remaining in position is readily known to the processor, since the value of variable S equals the number of shelves that remain in position). If no shelves remain in position, then an auditory note of longer duration and/or tonal quality is provided.

Regardless of whether the auditory mode has been selected, the value of variable S remains in memory, and can be accessed by the operator via, for example, the serial data link. This allows the operator to determine the inventory status of the machine from a remote location.

Figure 12:
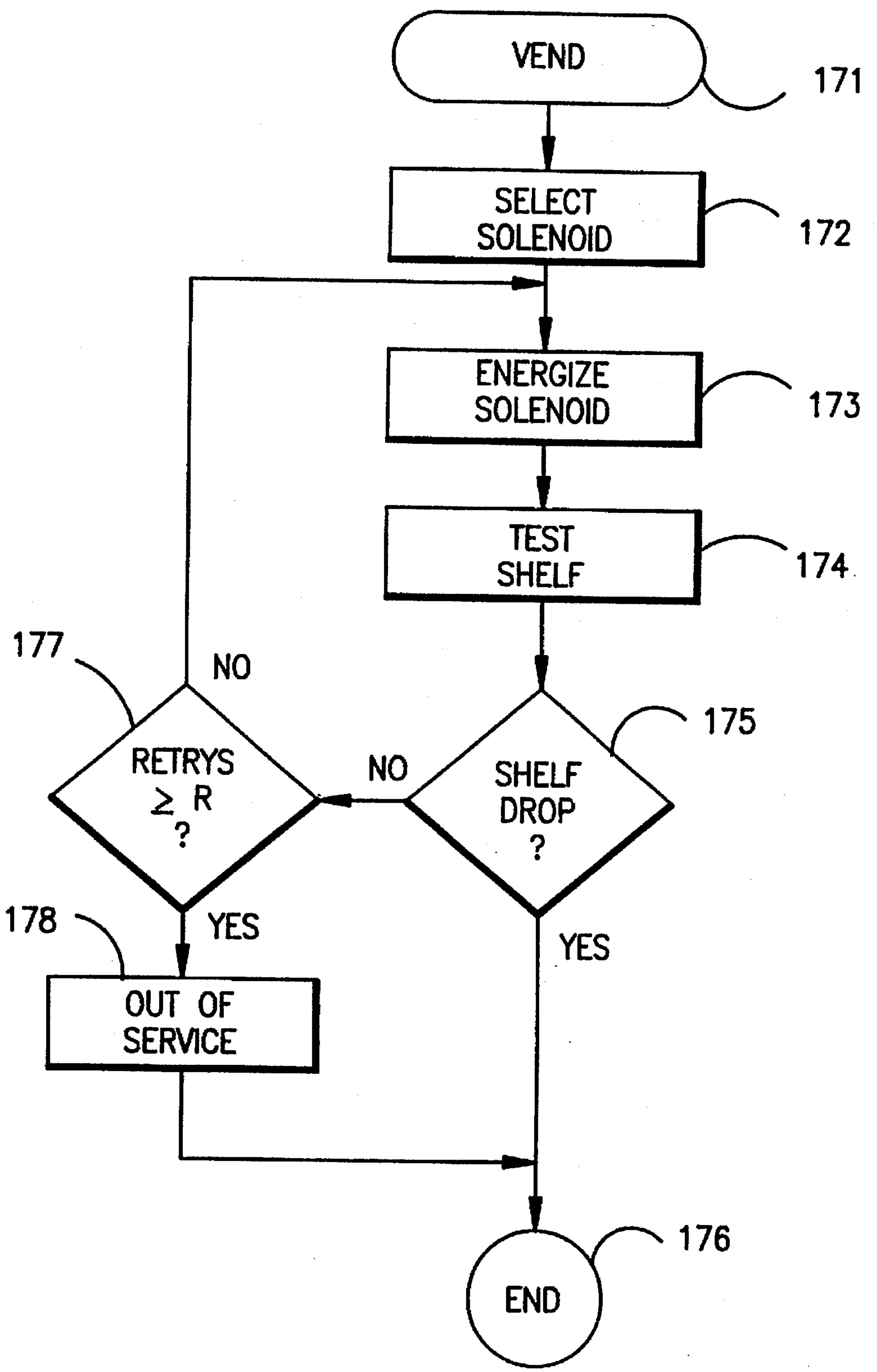
FIG. 12 comprises a flow diagram depicting operation of a drop shelf vending machine as configured in accordance with the invention.

This ability to test the position of the shelf is useful, as shown above, to conduct an inventory of the associated vending apparatus. This ability is also useful, however, during the vending process itself. To illustrate this, refer now to FIG. 12. During the vending process 171, a solenoid is selected 172 as corresponds to a particular product to be vended. This solenoid is then energized 173 to cause the associated shelf to drop. Following this, the position of the shelf can be tested 174 as described above. If the shelf has dropped 175, the vending process has successfully concluded and the process can end 176. If the shelf has not dropped 175, however, a vending retry can be immediately attempted. If the vending apparatus has already attempted a predetermined number of retries 177, of course (such as 5), the retry attempts can be concluded, and an "out of service" course of action can be taken.

So configured, the vending apparatus disclosed above offers both improved reliability and improved serviceability. Customers are more likely to receive what they seek to purchase, operators can inventory the machine without opening the machine unnecessarily, and some forms of vandalism can be sensed and responded to.

What is claimed is:

1. A method of operating a vending machine, comprising the steps of:

receiving a particular acoustic input;

upon detecting the particular acoustic input, automatically inventorying at least some predetermined contents of the vending machine, and performing the automatically inventorying of the at least some predetermined contents of the vending machine by determining whether each shelf in the vending machine is in an upright or dropped position.

2. The method of claim 1, wherein the step of determining whether each shelf in the vending machine is in an upright or dropped position includes the step of determining whether each shelf and an associated solenoid are then presently forming a series electrical circuit.

3. The method of claim 1, and further including the steps of:

receiving a different particular acoustic input; and upon receiving the different particular acoustic input, automatically retrying a last vending operation.

4. The method of claim 3, and further including the steps of:

receiving a yet different particular acoustic input; and upon receiving the yet different particular acoustic input, automatically identifying the yet different particular acoustic input as representing vandalism with respect to the vending machine.

5. The method of claim 2, and further including the steps of:

receiving a different particular acoustic input; and upon receiving the different particular acoustic input, automatically retrying a last vending operation.

6. The method of claim 5, and further including the steps of:

receiving a yet different particular acoustic input; and upon receiving the yet different particular acoustic input, automatically identifying the yet different acoustic input as representing vandalism with respect to the vending machine.

* * * * *